United States Patent [19]

Otto, Jr.

[11] 4,410,497
[45] Oct. 18, 1983

[54] SEPARATION OF URANIUM FROM CARBONATE CONTAINING SOLUTIONS THEREOF BY DIRECT PRECIPITATION

[75] Inventor: John B. Otto, Jr., Dallas, Tex.

[73] Assignee: Mobil Oil Corporation, New York, N.Y.

[21] Appl. No.: 342,863

[22] Filed: Jan. 26, 1982

[51] Int. Cl.³ .................. C22B 60/02; C01G 43/01
[52] U.S. Cl. .................................. 423/16; 423/11; 423/17; 423/18; 423/55; 299/5
[58] Field of Search .................. 423/11, 16, 17, 18, 423/55; 299/4, 5

[56] References Cited

U.S. PATENT DOCUMENTS

| | | | |
|---|---|---|---|
| 2,780,519 | 2/1957 | Kaufman et al. | 423/18 X |
| 2,815,261 | 12/1957 | Thunaes et al. | 423/11 |
| 2,815,263 | 12/1957 | Eldredge | 423/17 |
| 2,885,270 | 5/1959 | Karcher et al. | 423/17 X |
| 2,896,930 | 7/1959 | Menke | 423/17 X |
| 4,105,253 | 8/1978 | Showalter | 423/17 X |
| 4,282,188 | 8/1981 | Demarthe et al. | 423/11 X |
| 4,301,122 | 11/1981 | Johnson | 423/17 |

FOREIGN PATENT DOCUMENTS 555622  4/1958  Canada .................... 423/18

Primary Examiner—Deborah L. Kyle
Assistant Examiner—Matthew A. Thexton
Attorney, Agent, or Firm—Alexander J. McKillop; James F. Powers, Jr.; John K. AboKhair

[57] ABSTRACT

A direct precipitation method based on the insolubility of uranyl phosphate in carbonate containing solutions at pH 6–6.5 and its insolubility at pH 8 is described. The method eliminates the use of ion exchange columns for removing uranium values from uranium leachates and can be readily applied to an integrated field operation.

56 Claims, 1 Drawing Figure

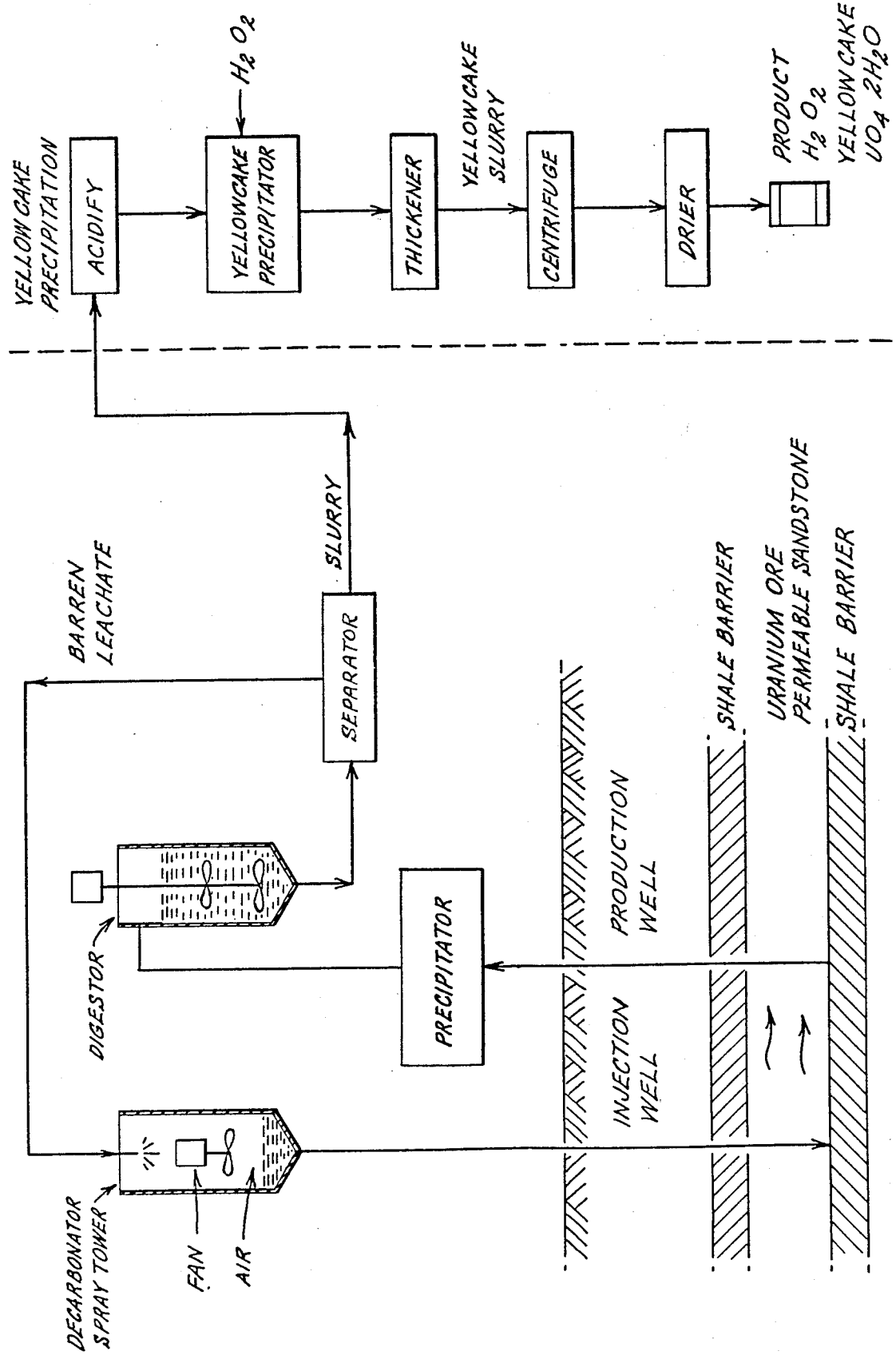

SEPARATION OF URANIUM FROM CARBONATE CONTAINING SOLUTIONS THEREOF BY DIRECT PRECIPITATION

FIELD OF THE INVENTION

This invention relates broadly to the recovery of uranium values from solutions thereof by direct precipitation. The invention has particular application is removing uranium values from uranium pregnant leachates by providing an alternative (or auxiliary) to the use of ion exchange columns.

BACKGROUND OF THE INVENTION

Until the 1950's, uranium was generally recovered from leach solutions by precipitation of the uranium. Precipitation methods for isolating uranium were abandoned since quantitative precipitation was not achieved, costs were high, and recirculation of solutions was necessary to prevent high uranium losses. One such method involved reducing with iron and precipitating uranium from sulfuric acid leach solutions as uranous phosphate at a pH between 1.0 and 2.8. A variation of that method involved adding copper sulfate and phosphoric acid to the leach solution and then either adding iron powder or percolating the solution through iron scrap. See R. C. Merritt, *The Extractive Metallurgy of Uranium*, Colorado School of Mines, pages 223–227 (1971). Because of numerous disadvantages of these precipitation methods, ion exchange techniques developed in the 1950's replaced the precipitation methods for isolating uranium. Instead of precipitating the uranium in the leachate, the leachate was passed over an ion exchange column where uranium ions became bound, and thus concentrated. The uranium was then eluted from the column.

Ion exchange columns are now very commonly used to isolate uranium from leachates obtained from the treatment of insoluble uranium deposits, such as those in subterranean formations, with a carbonate-oxidant leach solution. The oxidant in the carbonate-oxidant leachant, e.g., oxygen, hydrogen peroxide, sodium chlorate or sodium hypochlorite, oxidizes uranium from the insoluble tetravalent state to the soluble hexavalent state according to the overall reaction scheme

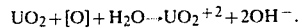
$$UO_2 + [O] + H_2O \rightarrow UO_2^{+2} + 2OH^-.$$

The carbonate in the carbonate-oxidant leachant, obtained for example from ammonium carbonate, sodium bicarbonate, sodium carbonate, carbon dioxide and sodium hydroxide, carbon dioxide and water, or mixtures of the foregoing, combines with uranium in the hexavalent state to form stable and soluble uranyl carbonate complexes, one of which is produced according to the equation

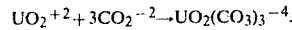
$$UO_2^{+2} + 3CO_2^{-2} \rightarrow UO_2(CO_3)_3^{-4}.$$

The resulting solutions of soluble uranyl carbonate complexes are passed through the ion exchange column. Uranium is eluted from the column and may then be converted to the yellowcake form.

One problem in using ion exchange for concentrating and isolating uranium arises from the presence in the leachate of minerals other than uranium which compete with uranium in the ion exchange process for sites on the ion exchange resin. One such mineral, sodium chloride, when present in the leachate in large amounts, makes uranium concentration and isolation on the ion exchange column difficult if not impossible.

Another problem in using ion exchange resins in concentrating uranium is the presence in the leachate of strongly absorbed substances which resist normal elution and interfere with the loading of uranium. These materials are called resin "poisons" and include silica, molybdenum, polythioate, sulfur and organics. See R. C. Merritt, *The Extractive Metallurgy of Uranium*, Colorado School of Mines, pages 163–166 (1971).

SUMMARY OF THE INVENTION

This invention is directed to concentrating and isolating uranium from carbonate containing solutions thereof, for example solutions (leachates) produced by leaching and extracting insoluble uranium deposits with carbonate-oxidant leachants. It has been discovered that under controlled pH conditions the uranium can be isolated directly from such carbonate solutions as phosphate precipitate.

The isolation method is rapid and can be effected in leachates containing low soluble uranium concentrations (2 ppm $U_3O_8$ or greater). Also, isolation of uranium in accordance with the invention can be accomplished in the presence of relatively high molybdenum concentrations. Thus, uranium-molybdenum separations can be made which may be very difficult under certain conditions using ion exchange resins. Moreover, isolation in accordance with the invention can be undertaken at high salt (such as sodium chloride) and relatively high carbonate concentrations. Thus, uranium can be leached and isolated from high brine content formations and waters, such as those of deep wells where ion exchange would not be operable.

The invention also is directed to an integrated 3-phase process which incorporates the above concentrating and isolating step in a practical field application. The three phases include (1) preconditioning the formation prior to leaching, (2) leaching and subsequently precipitating the uranium, and (3) restoring the leachate to its pre-leach condition.

Further, the invention is directed to isolating uranium from leachate which is obtained from any process (whether acid, alkaline, pre-treated or not pre-treated) and from any other uranium-containing fluid fraction (i.e., from uranium mill, heap leach, mine-tailings leach, etc.).

DETAILED DESCRIPTION OF THE INVENTION

The invention is directed to a method of isolating uranium from carbonate containing solutions, e.g., leachates produced by leaching insoluble uranium deposits with carbonate-oxidant leachants. The invention is based on the twin discoveries that uranium is soluble as a uranyl carbonate anion complex in the carbonate leachate containing excess amounts of orthophosphate at a first pH above about 7 and that at a second pH below said first pH uranium is precipitated as a phosphate. The invention can be applied to leachates produced by all types of leaching, batch or continuous.

The source of phosphate in the leachate is any orthophosphate which is soluble in the leachate. Although various phosphates may be used as the source of orthophosphate, $Na_2HPO_4$ has been generally used in the experiments reported below. The amount of phosphate used is at least a stoichiometric amount based on the uranium content of the leachate. The phosphate precipitate of uranium produced as a result of the method will simply be referred to below as a phosphate precipitate of uranium. However, there is excellent agreement between actual results and theoretical calculations to support its identification as uranyl phosphate, $UO_2HPO_4 \cdot 4H_2O$.

The effect of pH on isolating uranium in accordance with the invention is shown by the fact that uranium was found to be soluble at pH 8 in a leachate of the composition 100 ppm $U_3O_8$ as uranyl carbonate anionic complex, 1000 ppm $CO_3^{-2}$, 1000 ppm $Cl^{-1}$ containing from 2- to 10-fold excess of ortho phosphate ion, $PO_4^{-3}$, but that all the uranium was precipitated as uranyl phosphate, $UO_2HPO_4$, from this leachate when the pH is lowered to between 6.5 and 7 by carbon dioxide addition. This is further established by the following summary:

| ORIGINAL COMPOSITION OF LEACHATE AT pH 8 | | | | |
|---|---|---|---|---|
| ppm | | | | Multiple of $PO_4^{-3}$ required to |
| $CO_3^{-2}$ | $Cl^{-1}$ | $PO_4^{-3}$ | $U_3O_8$* | precipitate |
| 1000 | 1000 | 96 | 95.6 | 3x |
| 1000 | 1000 | 351 | 94.4 | 11x |

*As uranyl carbonate anionic complex.

COMPOSITION OF LEACHATE AFTER URANIUM
WAS PRECIPITATED AS URANYL PHOSPHATE,
$UO_2HPO_4$, BY LOWERING pH TO 6.3
BY $CO_2$ ADDITION

| ppm | | | | |
|---|---|---|---|---|
| $CO_3^{-2}$ | $Cl^{-1}$ | $PO_4^{-3}$ | $U_3O_8$ | Excess $PO_4^{-3}$ |
| 1000 | 1000 | 64 | 0 | 2x |
| 1000 | 1000 | 320 | 0 | 10x |

Thus, uranium in the carbonate leachate is soluble as a soluble uranyl carbonate anion complex at a pH of 8 and higher in the presence of as much as a ten-fold excess of orthophosphate. The following equations may explain this phenomenon:

$NaHCO_3 + NaOH \rightarrow Na_2CO_3$, at pH~11

$H_2CO_3 + NaOH \rightarrow NaHCO_3$, at pH~8

$CO_2 + H_2O \rightarrow H_2CO_3$, at pH~5.

These equations suggest that carbonate ion, $CO_2^{-2}$, concentrations increase as pH increases to 11. In terms of the uranium content of the leachage, formation of the stable uranyl tricarbonate anion complex, $[UO_2(CO_3)_3]^{-4}$ is favored at high pH. As the pH is decreased with a decrease in carbonate ion concentration, the equilibrium favors the formation of the soluble but less stable uranyl dicarbonate anion complex, $[UO_2(CO_3)_2]^{-2}$. Equilibrium considerations appear to favor decomposition of the uranyl dicarbonate anion complex at a pH lower than 7 and formation of the phosphate precipitate of uranium in accordance with an equilibrium illustrated by the following equation:

$Na_2[UO_2(CO_3)_2] + Na_2HPO_4 + 2H_2CO_3 \rightleftharpoons UO_2HPO_4 \downarrow + 4NaHCO_3$ The following table shows the effect of pH on the solubility of uranyl phosphate product in such leachates.

| pH | Solubility, ppm $U_3O_8$ |
|---|---|
| 7.0 | 0.0 |
| 7.4 | 0.8 |
| 7.7 | 20.4 |

Practically, it has been noted that precipitation in accordance with the invention is relatively slow when undertaken at a pH ranging from below 8 to about 7. However, when the pH is dropped below 7, precipitation occurs more rapidly. At a pH of 6.5 substantially complete uranium precipitation can occur in about 15 minutes. At a pH of 6.27, substantially complete (about 100%) uranium precipitation was found to occur immediately.

Significantly, high chloride ion content does not interfere with precipitation in accordance with the invention. That is, in carbonate leachates containing 1000 ppm chloride ion (present as sodium chloride) precipitation is rapid and the precipitate is gelatinous. By comparison, at chloride ion concentrations of 100,000 ppm, precipitation is not quite so rapid; but at the high chloride ion concentration the precipitate exhibits superior physical properties of increased density and graininess which facilitate its isolation. In short, the invention can be readily employed with leachates which are highly saline, i.e., those containing 10,000 to 200,000 ppm chloride ion.

High carbonate content is also tolerated during the phosphate precipitation of uranium. Leachates containing carbonates in amounts conventionally used in in-situ leaching operations have no effect on the phosphate precipitation of uranium. In leachates containing 1000 and 2000 ppm carbonate, uranium precipitates rapidly with a 2-fold excess of phosphate. At a carbonate concentration of 4000 ppm, uranium precipitates (but more slowly) using a 10-fold excess of phosphate. At a concentration of 10,000 ppm carbonate, no uranium precipitate can be detected, even with a 147-fold excess of phosphate. This effect is believed to be attributable to the effect of mass action of the excessive carbonate concentration to reverse the equilibrium of the equation $Na_2[UO_2(CO_3)_2] + Na_2HPO_4 \rightarrow UO_2HPO_4 \downarrow + 2Na_2CO_3$ The law of mass action appears to apply equally to the situation in which a 29-fold phosphate excess resulted in precipitation of about 75% of uranium in a solution containing 100 ppm $U_3O_8$, 1000 ppm carbonate and 1000 ppm chloride ion and maintained at a pH of 8.

When uranyl phosphate precipitation was performed under the pH conditions of the invention on a synthetic leachate containing 200 ppm molybdenum, 100 ppm $U_3O_8$, 1000 ppm carbonate, 1000 ppm chloride, and 100 ppm phosphate, only 1% of the molybdenum was found in the precipitate. Therefore, the process of this invention is believed to be capable of providing a very good separation of uranium from molybdenum and from various other contaminants, e.g., vanadium, selenium, arsenic, etc.

Another important advantage of the process of this invention is the ability to readily convert the uranyl phosphate precipitate to marketable $H_2O_2$ yellowcake. In order to eliminate phosphate contamination the pH should be kept in the range of about 1 to 1.5. Otherwise, the yellowcake formation process is the same as that conventionally employed in the art.

The process of this invention has particular application in the field as part of an integrated process which includes (1) a preconditioning phase, (2) a leaching, phosphate precipitation, $H_2O_2$ yellowcake precipitation phase, and (3) a restoration phase. This integrated process is illustrated by the flow chart of the drawing, wherein the method of the invention is applied to leachates produced by in-situ leaching with carbonate oxidant leachants.

In the flow chart, carbonate-oxidant leachant is injected into the formation through the injection well and allowed to extract uranium. The uranium pregnant leachates are pumped through the production well to ground level. The leachate is treated (e.g., by introducing carbon dioxide to lower pH) in the precipitator to precipitate uranium in accordance with the invention. The precipitate is passed to the digestor(s). Then the contents of the digestor can be centrifuged to yield a precipitate slurry and a supernatant which is uranium barren leachate. The supernatant is recycled through a decarbonator spray tower (where pH is increased to about 8 by introducing air and removing $CO_2$) for injection into the injection well. The precipitate slurry is subjected to conditions for conversion of the uranium precipitate to yellowcake.

The leachant introduced into the injection well can contain levels of carbonate and of oxidant which are conventional. Carbonate-oxidant leachants conventionally contain about 1000 to about 2000 ppm carbonate concentrations. The oxidant can be gaseous oxygen introduced through a sparger near the bottom of the injection well or hydrogen peroxide introduced at ground level just prior to injection. Free carbonate content of the waters can be monitored and adjusted, if necessary, to maintain the carbonate levels of the leachant.

Although the leaching conditions can vary, they will control the conditions of precipitation in the precipitator. The leachant may contain, in addition to oxidant and carbonate, the source of phosphate necessary to precipitate uranium provided that the pH of the leaching solution is maintained at about 8 and provided that the formation has been preconditioned by passing carbonate lixiviants free of oxidants through the uranium containing formation. Then precipitation in the precipitator will be effected by adjusting the pH to below about 7.7, preferably as low as about 6.5. Alternatively, leaching may be undertaken in the absence of phosphate at a pH of 8 provided that the formation has been preconditioned by passing carbonate lixiviants free of oxidants through the uranium containing formation. In order to precipitate the uranium (of the leachate produced in the alternative method) in the precipitator, both phosphate addition to the leachate and pH adjustment to below about 7.7, preferably to 6.5, may be carried out either in the precipitator or prior to the precipitator.

Both of those leaching methods involve a preconditioning stage prior to leaching. The preconditioning stage involves passing carbonate lixiviants containing 1000 to 2000 ppm carbonate in the absence of oxidant used in the subsequent leaching and presents several advantages in addition to maximizing the efficiency of the leach stage. The preconditioning stage serves to keep the radium daughter of uranium in the formation and thereby prevents its movement to the surface. In addition, the preconditioning stage serves to precipitate soluble calcium and/or magnesium values which might otherwise be extracted during the leaching stage; soluble calcium values in the latter leach stage might interfere with quantitative uranium phosphate precipitation since calcium phosphate is insoluble. Well spacing, formation thickness, permeability and pumping rate are all factors which can determine the time duration of the preconditioning stage. Accordingly, the preconditioning stage may continue for a time ranging from about a couple of weeks to about a year depending on said factors. Such preconditioning is a conventional practice.

In the absence of pH adjustment during leaching and in the absence of a stage to precondition the formation, phosphate can be added to the leachate after it is removed from the ground. The pH of the leachate can be adjusted to below about 7.7, preferably to as low as about 6.5, and the orthophosphate added. At a pH of 6.5 uranium preferentially precipitates by titration. Calcium, as well as magnesium, in non-interfering amounts stay in solution at a pH of 6.5. Interfering amounts of calcium and/or magnesium could be removed from the leachate by reverse osmosis or ion exchange prior to uranium precipitation.

In the precipitator, pH of the leachate is adjusted to below 8 and preferably below about 7.7 to as low as about 6.5. When pH adjustment to below 8 involves a decrease in pH, the decrease in pH can be effected by injecting carbon dioxide into the precipitator. The amount of orthophosphate present in the precipitator should be at least an equivalent amount based on the uranium content of the leachate. Precipitation may be accelerated by the addition of flocculants such as alum, hydrolyzed polyacrylonitrile, defibrinated soluble dried blood, blood albumen, modified animal glue, organic polyelectrolytes, polymers of acrylamide, sodium carboxymethylcellulose, guar gum (technical grade), water soluble synthetic polymers, polyelectrolyte plus bentonite, algin, polycarboxylic acid, starch ether, cold-water-swelling starch, starch, processed montmorillonite, $Na_2Al_2O_4.3H_2O$, modified cationic starch derivatives, pearl corn starch, corn starch, dextrine, long chain animal glue, activated silica sol, $SiO_2$, sulfonated glyceride, amphoteric high polymers such as protein, and admixtures thereof.

After precipitation, the phosphate precipitate of uranium can be digested and then passed to a separator to yield a precipitate slurry and supernatant liquid. The supernatant is a uranium-barren leachate and has a pH of about 6.5 to about 7; it can be aerated to remove $CO_2$ in the decarbonator spray tower and to thus increase its pH, for example, to about 8. Isolation of the precipitate may be effected by filtration, in gravity thickeners, a claricone, a hydroclone, a vortex clarifier, by froth flotation or by cross flow filtration.

The slurry of precipitate isolated during separation can be subjected to one of the two alternative precipitation processes to produce yellowcake. In the process depicted in the flow chart, the slurry is acidified to dissolve the slurry. Preferably the pH of the acidified slurry is about 1.5 or less since the phosphate content of the yellowcake increases above about 1% as the pH of acidification increases above 1.5. Precipitation of the acidified dissolved slurry can be effected by treating it with hydrogen peroxide. Generally the amount of hydrogen peroxide is a 2- to 3-fold excess. The yellowcake can be concentrated in a thickener, centrifuged and dried.

In an alternative precipitation procedure for forming yellowcake, the uranium phosphate precipitate is redissolved by adding sodium carbonate solution to produce the sodium salt of the uranyl dicarbonate anion complex which, in turn, with increasing carbonate concentration will convert to the sodium salt of the uranyl tricarbonate anion complex. Sodium hydroxide is added to the sodium salt of the uranyl tricarbonate anion complex to produce a solution of pH of about 13 and resulting in a hydrolysis product precipitate which contains sodium uranate, sodium diuranate, sodium polyuranate and/or admixtures thereof. The hydrolysis product is isolated and acidified with HCl to produce $UO_2Cl_2$ which is soluble in solution. The $UO_2Cl_2$ solution is then precipitated with hydrogen peroxide to produce yellowcake according to the following equation:

$$UO_2Cl_2 + H_2O_2 \rightarrow UO_4 \downarrow + 2HCl.$$

Phosphate containing supernatants produced as a result of precipitation of uranium to yellowcake may be reclaimed and cycled back for use in the original phosphate precipitation step. It may be necessary to elevate the pH of the supernatant containing phosphate to about 10 with NaOH to hasten decomposition of $H_2O_2$. The presence of $H_2O_2$ could lead to precipitation of uranium in the formation; after $H_2O_2$ decomposition, the pH of the supernatant may be decreased to about 8 before mixing with barren leachate.

After leaching it may be necessary to restore the formation and to lower the uranium, carbonate, phosphate and sodium chloride content of the formation water to pre-leach levels. After depleting the formation of uranium, leaching will cease by cutting off the oxygen sparger. The carbonate content can be lowered by adding acid to the leachate stream before it enters the decarbonator spray tower. Carbonate removal and reduction, by use of HCl, is governed by the equation:

$$NaHCO_3 + HCl \rightarrow NaCl + H_2O + CO_2.$$

One method of reducing phosphate content includes adding calcium chloride to the leachate ahead of the digestor to precipitate phosphate as calcium phosphate. Such phosphate depletion is illustrated by the equation:

$$2Na_2HPO_4 + 3CaCl_2 \rightarrow 4NaCl + 2HCl + Ca_3(PO_4)_2 \downarrow.$$

The insoluble calcium phosphate is removed using a thickener and can be used to prepare agricultural fertilizer. The sodium chloride and excess calcium chloride can be removed by reverse osmosis.

The foregoing description of my invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is my invention in the following claims to cover all such equivalent modifications and variations as fall within the true scope and spirit of my invention.

I claim:

1. A process for removing uranium values from a liquid solution at pH above about 7 containing carbonate and uranyl ions which comprises dissolving phosphate ions in said solution and lowering the pH of said solution sufficient to precipitate said uranium.

2. A process as defined in claim 1, wherein said liquid solution is a leachate.

3. A process as defined in claim 2 wherein said leachate contains at least 10,000 ppm chloride ion.

4. A process as defined in claim 2 wherein said leachate is obtained from an in situ leaching operation, a heap leaching operation, or a mine tailings recovery operation.

5. A process as defined in claim 1 wherein said precipitate is formed by (a) adjusting the pH of said solution to a first pH higher than 7; (b) adding a source of phosphate ion which is soluble in said solution; and (c) lowering the pH of said solution to a second pH at which said uranium precipitates out of solution.

6. A process as defined in claim 5 wherein any calcium or magnesium ions present in said solution after carrying out step (a) are removed before carrying out step (b).

7. A process as defined in claim 5 wherein a flocculant is added to said solution before carrying out step (c).

8. A process as defined in claim 5 wherein said source of phosphate ion is added in an amount sufficient to cause substantial precipitation of said uranium upon said lowering of pH.

9. A process as defined in claim 5 wherein said source of phosphate ion is added in an amount sufficient to provide at least a stoichiometric quantity of phosphate ion based on the uranium present in said solution.

10. A process as defined in claim 5 wherein the uranium-containing solution subjected to step (c) is substantially free of precipitate which contains uranium.

11. A process as defined in claim 5 wherein said liquid solution pH is about 8 or higher and said second pH is about 7 or lower.

12. A process as defined in claim 5 wherein said pH is lowered to said second pH by adding carbon dioxide to the solution.

13. A process as defined in claim 5 wherein said source of phosphate ion is an ortho-phosphate compound.

14. A process as defined in claim 5 wherein said source of phosphate ion is disodium hydrogen orthophosphate heptahydrate.

15. A process as defined in claim 5 which further comprises (d) separating said precipitate from the liquid.

16. A process as defined in claim 15 which further comprises (e) dissolving the separated precipitate in an acid.

17. A process as defined in claim 16 wherein the pH of the resultant acid solution is between about 1 and about 2.

18. A process as defined in claim 17 which further comprises (f) adding hydrogen peroxide to the acid solution to form a uranium precipitate.

19. A process as defined in claim 18 wherein said uranium precipitate contains less than about 1% by weight phosphate.

20. A process as defined in claim 15 which further comprises dissolving the separated precipitate by adding a carbonate containing solution thereto, hydrolyzing the resultant uranyl carbonate, isolating the hydrolyzed product and acidifying same with hydrochloric acid to produce $UO_2Cl_2$, and treating the $UO_2Cl_2$ with hydrogen peroxide to produce yellowcake.

21. A process as defined in claim 5 wherein said liquid solution is a leachate.

22. A process as defined in claim 21 wherein said leachate contains at least 10,000 ppm chloride ion.

23. A process as defined in claim 21 wherein said leachate is obtained from a leaching operation which comprises passing a leachant through a mineral deposit containing insoluble uranium values and solubilizing said values.

24. A process for recovering uranium values from a subterranean deposit which comprises (a) penetrating said deposit with at least one injection well and at least one production well in spaced relation with said injection well; (b) treating the subterranean deposit to obtain a first pH of at least about 8 and a carbonate ion concentration of at least about 1000 ppm; (c) introducing into the deposit a source of phosphate ion and an oxidant capable of oxidizing said uranium to the hexavalent state; (d) producing leachate containing dissolved uranium values to the surface; and (e) lowering the pH of said leachate to a second pH at which the said uranium precipitates out of solution.

25. A process as defined in claim 24 wherein a flocculant is added to said solution before carrying out step (e).

26. A process as defined in claim 24 wherein the amount of phosphate ion present in said leachate is insufficient to precipitate the uranium in solution prior to carrying out step (e).

27. A process as defined in claim 24 wherein said first pH is about 8 or higher and said second pH is 7 or lower.

28. A process as defined in claim 24 wherein said carbonate concentration is obtained by adding carbon dioxide, carbonate ion and/or bicarbonate ion to said deposit.

29. A process as defined in claim 24 wherein said pH is lowered to said second pH by adding carbon dioxide to the solution.

30. A process as defined in claim 24 wherein said source of phosphate anion is an ortho-phosphate compound.

31. A process as defined in claim 24 wherein said source of phosphate ion is disodium hydrogen ortho-phosphate heptahydrate.

32. A process as defined in claim 24 which further comprises (f) separating said precipitate from the liquid.

33. A process as defined in claim 32 which further comprises (g) dissolving the separated precipitate in an acid.

34. A process as defined in claim 33 wherein the pH of the resultant acid solution is between about 1 and about 2.

35. A process as defined in claim 34 which further comprises (h) adding hydrogen peroxide to the acid solution to form a uranium precipitate.

36. A process as defined in claim 35 wherein said uranium precipitate contains less than about 1% by weight phosphate.

37. A process as defined in claim 32 which further comprises dissolving the separated precipitate by adding a carbonate containing solution thereto, hydrolyzing the resultant uranyl carbonate, isolating the hydrolyzed product and acidifying same with hydrochloric acid to produce $UO_2Cl_2$, and treating the $UO_2Cl_2$ with hydrogen peroxide to produce yellowcake.

38. A process for selectively removing uranium values from a liquid solution containing carbonate, uranium, and at least one other mineral value dissolved therein which comprises (a) adjusting the pH of said solution to a first pH higher than 7; (b) adding a source of phosphate ion which is soluble in said solution; and (c) lowering the pH of said solution to a second pH at which said uranium precipitates out of solution, the amount of said other mineral value present in said precipitate being less than 1% of its original content in said liquid solution.

39. A process as defined in claim 38 wherein any calcium or magnesium ions present in said solution after carrying out step (a) are removed before carrying out step (b).

40. A process as defined in claim 38 wherein a flocculant is added to said solution before carrying out step (c).

41. A process as defined in claim 38 wherein said other mineral value is molybdenum.

42. A process as defined in claim 38 wherein said source of phosphate ion is added in an amount sufficient to cause substantial precipitation of said uranium upon said lowering of pH.

43. A process as defined in claim 38 wherein said source of phosphate ion is added in an amount sufficient to provide at least a stoichiometric quantity of phosphate ion based on the uranium present in said solution.

44. A process as defined in claim 38 wherein the solution subject to step (c) is substantially free of precipitate which contains uranium.

45. A process as defined in claim 38 wherein said first pH is about 8 or higher and said second pH is about 7 or lower.

46. A process as defined in claim 38 wherein said pH is lowered to said second pH by adding carbon dioxide to the solution.

47. A process as defined in claim 38 wherein said source of phosphate ion is an ortho-phosphate compound.

48. A process as defined in claim 38 wherein said source of phosphate ion is disodium hydrogen ortho-phosphate heptahydrate.

49. A process as defined in claim 38 which further comprises (d) separating said precipitate from the liquid.

50. A process as defined in claim 49 which further comprises (e) dissolving the separated precipitate in an acid.

51. A process as defined in claim 50 wherein the pH of the resultant acid solution is between about 1 and about 2.

52. A process as defined in claim 51 which further comprises (f) adding hydrogen peroxide to the acid solution to form a uranium precipitate.

53. A process as defined in claim 52 wherein said uranium precipitate contains less than about 1% by weight phosphate.

54. A process as defined in claim 49 which further comprises dissolving the separated precipitate by adding a carbonate containing solution thereto, hydrolyzing the resultant uranyl carbonate, isolating the hydrolyzed product and acidifying same with hydrochloric acid to produce $UO_2Cl_2$, and treating the $UO_2Cl_2$ with hydrogen peroxide to produce yellowcake.

55. A process as defined in claim 38 wherein said liquid solution is a leachate.

56. A process as defined in claim 55 wherein said leachate contains at least 10,000 ppm chloride ion.

* * * * *